United States Patent
Furukawa et al.

(10) Patent No.: US 10,954,075 B2
(45) Date of Patent: Mar. 23, 2021

(54) CONVEYING DEVICE, AND COMBINATION WEIGHING APPARATUS HAVING THE CONVEYING DEVICE

(71) Applicant: ISHIDA CO., LTD., Kyoto (JP)

(72) Inventors: Takuma Furukawa, Ritto (JP); Toshiharu Kageyama, Ritto (JP); Hideshi Miyamoto, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 130 days.

(21) Appl. No.: 16/356,725

(22) Filed: Mar. 18, 2019

(65) Prior Publication Data

US 2019/0291966 A1 Sep. 26, 2019

(30) Foreign Application Priority Data

Mar. 20, 2018 (JP) .............................. JP2018-052813

(51) Int. Cl.
*G01G 13/24* (2006.01)
*G01G 13/18* (2006.01)
(Continued)

(52) U.S. Cl.
CPC ........... *B65G 43/08* (2013.01); *G01G 13/003* (2013.01); *G01G 13/18* (2013.01); *G01G 13/24* (2013.01);
(Continued)

(58) Field of Classification Search
CPC .... G01G 19/393; G01G 13/24; G01G 13/003; G01G 13/18; G01G 13/006; B65G 43/08; B65G 2203/0258; B65G 2812/0312
(Continued)

(56) References Cited

U.S. PATENT DOCUMENTS 2,949,655 A * 8/1960 Berumen ................ B28B 23/06
425/111
3,250,371 A * 5/1966 Cella ....................... B65B 21/04
53/497
(Continued)

FOREIGN PATENT DOCUMENTS

| GB | 1548361 A | 7/1979 |
|---|---|---|
| JP | H11-326023 A | 11/1999 |
| JP | 2017-053747 A | 3/2017 |

OTHER PUBLICATIONS

Extended European search report issued by the European Patent Office dated Jul. 18, 2019, which corresponds to European Patent Application No. 19162887.4 and is related to U.S. Appl. No. 16/356,725.

*Primary Examiner* — Jacques M Saint Surin
(74) *Attorney, Agent, or Firm* — Studebaker & Brackett PC

(57) ABSTRACT

The object of the present invention is to provide a novel conveying device with which it is possible to easily adjust a conveying amount of articles in a trough using a restricting plate, and a combination weighing apparatus having the conveying device.

A conveying device to convey articles in a trough has a restricting plate to restrict a flow of the articles in the trough and the angle at which the restricting plate faces the articles is variable. With this configuration, there is no need to prepare a plurality of restricting plates that have different shapes and materials or to exchange such a plurality of restricting plates in the same manner as in a conventional device because the conveying amount in the trough can be adjusted merely by varying the angle at which the restricting plate faces the articles.

7 Claims, 3 Drawing Sheets

(51) Int. Cl.
*G01G 13/00* (2006.01)
*G01G 19/393* (2006.01)
*B65G 43/08* (2006.01)

(52) U.S. Cl.
CPC ... *G01G 19/393* (2013.01); *B65G 2203/0258* (2013.01); *B65G 2812/0312* (2013.01); *G01G 13/006* (2013.01)

(58) Field of Classification Search
USPC .......................................................... 177/103
See application file for complete search history.

(56) References Cited

U.S. PATENT DOCUMENTS

| | | | | |
|---|---|---|---|---|
| 3,250,375 A * | 5/1966 | Bonthuis | ............. | B65G 17/002 198/460.3 |
| 3,451,563 A * | 6/1969 | Luginbuhl | ........... | B65G 47/082 414/798.3 |
| 3,506,017 A * | 4/1970 | Schubert | ................ | A24C 5/471 131/94 |
| 5,207,543 A * | 5/1993 | Kirma | .................... | F16B 39/08 411/121 |
| 6,554,526 B1 * | 4/2003 | Egelandsdal | ............ | A63H 3/46 403/294 |
| 2013/0175100 A1 * | 7/2013 | Farlotti | ............ | G07B 17/00661 177/145 |

* cited by examiner

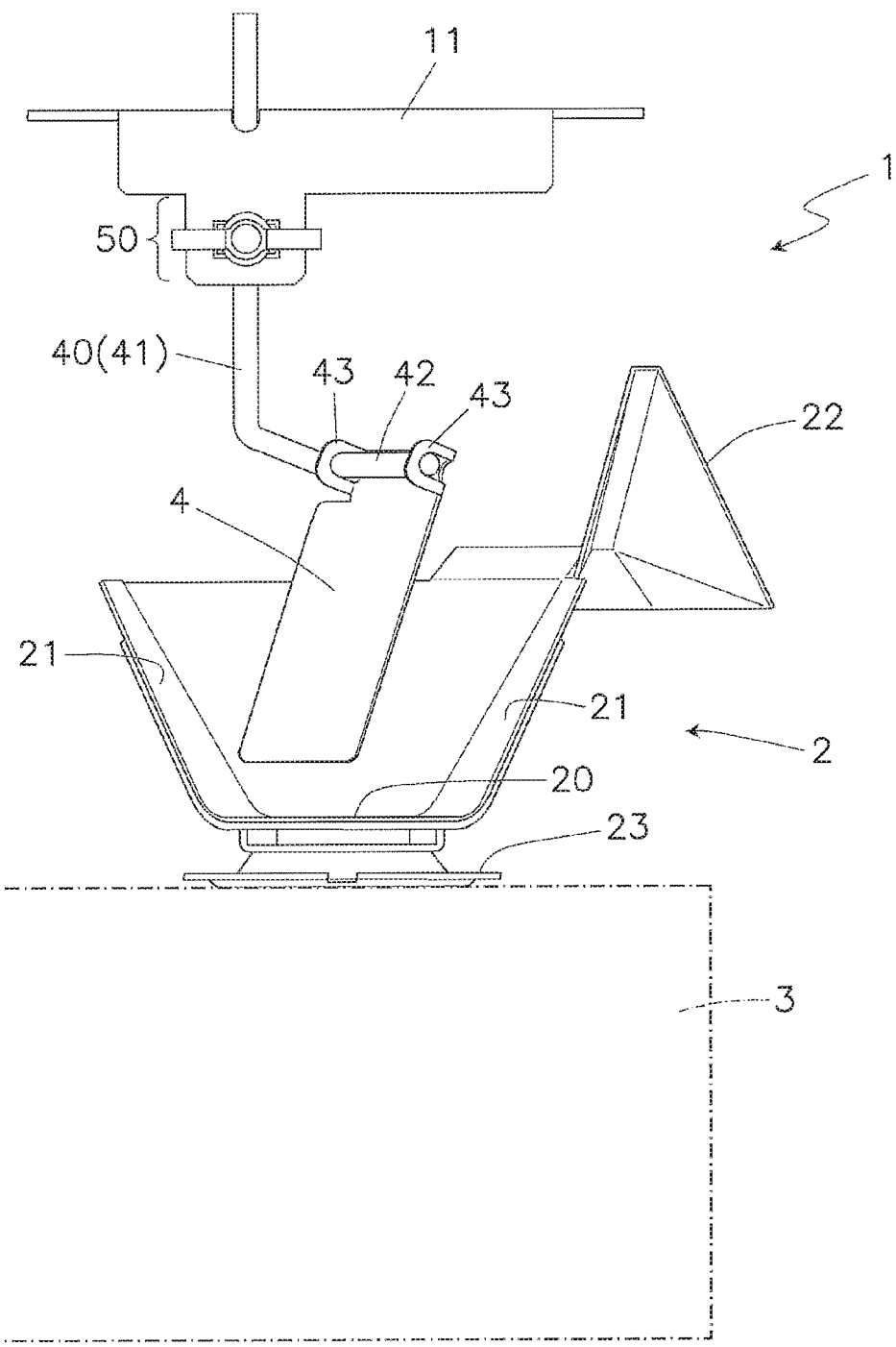
F I G. 1

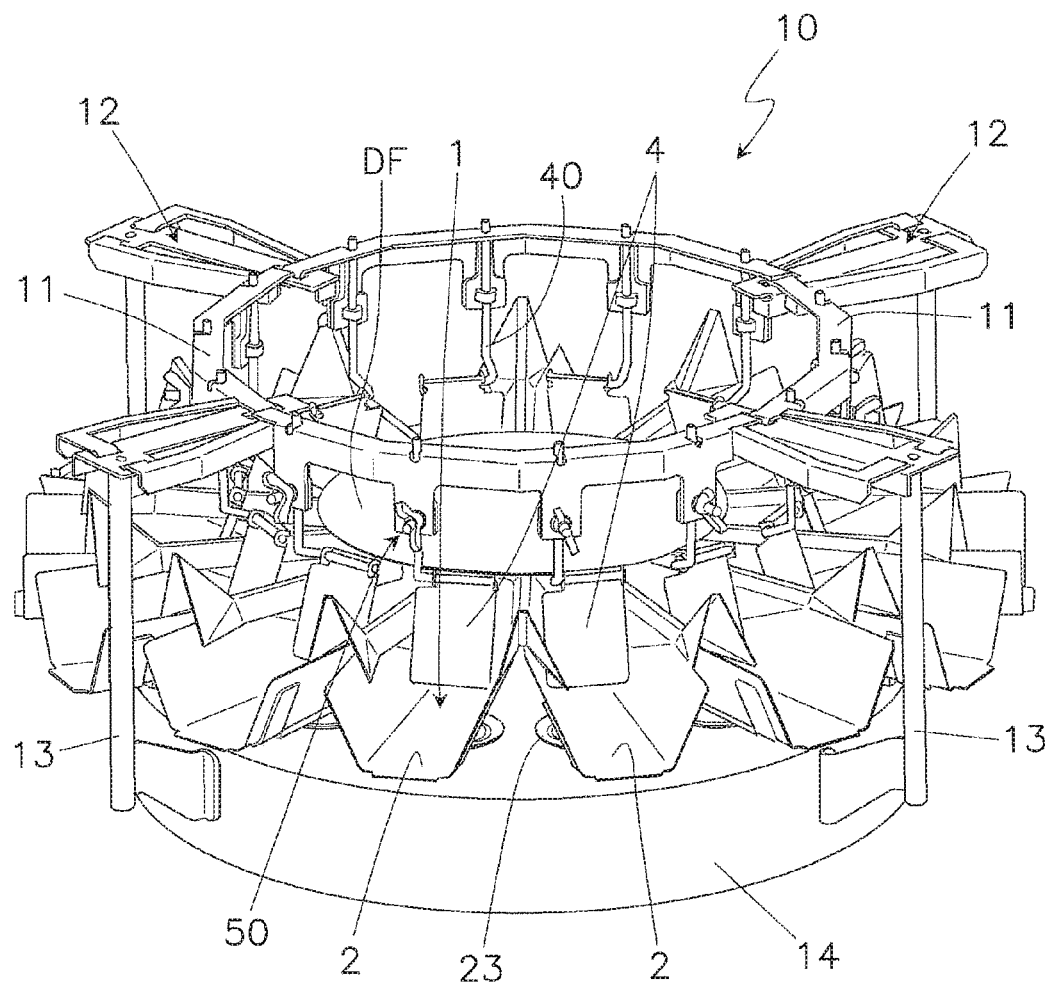
F I G. 3

CONVEYING DEVICE, AND COMBINATION WEIGHING APPARATUS HAVING THE CONVEYING DEVICE

TECHNICAL FIELD

The present invention relates to a conveying device to adjust a conveying amount of articles using a restricting plate, and a combination weighing apparatus having the conveying device.

BACKGROUND ART

A vibrating feeder is known as one example of a conveying device to convey articles while breaking up the articles. The vibrating feeder has a trough forming a conveyance path for the articles, and a vibrator to cause the trough to vibrate along a prescribed angle of elevation and to cause the articles in the trough to advance in jumps.

In such a vibrating feeder, a conveying amount of the articles is controlled by controlling an amplitude and vibration time of the vibrator. Various restriction members described in the patent literature below are also used.

In Patent Literature 1, a layer thickness restricting member is attached to a trough, serving as a conveyance path for articles, in a position-adjustable manner in the vertical direction so that a layer thickness of the articles in the trough is adjustable. In Patent Literature 2, one of passage width restricting members respectively having different shapes and materials is disposed in an exchangeable manner above a trough so that a conveying amount in the trough is adjusted in accordance with the articles.

SUMMARY OF THE INVENTION

Technical Problem

However, the restricting member described in Patent Literature 1 can control only the layer thickness of the articles. Therefore, the technology described in Patent Literature 1 is not sufficiently effective for aggregates for which it is difficult to adjust the conveying amount by controlling the layer thickness alone. By contrast, the passage width restricting member disclosed in Patent Literature 2 can be exchanged with the one having a different shape and material in accordance with the articles. Therefore, the passage width restricting member disclosed in Patent Literature 2 shows higher versatile usage.

However, the passage width restricting members disclosed in Patent Literature 2 need to be exchanged. For exchange, it is necessary to prepare a plural passage width restricting members having different shapes and materials. It therefore incurs high cost. In addition, if the passage width restricting members disclosed in Patent Literature 2 are used for the conveying device in a combination weighing apparatus, the passage width restricting members need to be exchanged for the all troughs of conveying devices arranged in a circle. Therefore, it reduces operating efficiency and requires a lot of time for adjustment.

An object of the present invention is to provide a novel conveying device which resolves such problems and with which it is possible to easily adjust a conveying amount of articles in a trough using a restricting plate, and to provide a combination weighing apparatus having the conveying device.

Solution to Problem

In one aspect, a conveying device according to the present invention is a conveying device to convey articles in a trough, characterized in having a restricting plate to restrict a flow of the articles in the trough, the angle at which the restricting plate faces the articles is variable.

As used herein, the term "the angle at which the restricting plate faces the articles" refers to an angle formed when, for example, the restricting plate is caused to pivot from an angle of zero toward a conveyance direction of the articles about a vertical axis, where the angle of zero is formed when the restricting plate is oriented in a direction orthogonal to the conveyance direction. Specifically, the term refers to the angle of rotation in a direction intersecting the direction of the angle of zero. Thus, the restricting plate is oriented in the direction orthogonal to the conveyance direction when the aforementioned angle is zero. A space between a side surface of the trough and the restricting plate therefore decreases to a minimum, and a conveying amount of the articles feeding through the space is minimized. As the angle at which the restricting plate faces the articles gradually increases from the angle of zero, a gap between the side surface of the trough and the restricting plate gradually widens. As a result, the conveying amount of the articles gradually increases. Therefore, according to the present invention, the conveying amount in the trough can be adjusted merely by varying the angle at which the restricting plate faces the articles. As a result, there is no need to prepare a plurality of restricting plates that have different shapes and materials or to exchange such plurality of restricting plates in the same manner as conventional devices.

Preferably, the conveying device is further characterized in that the restricting plate rotates about a position adjacent to one side surface of the trough serving as an axis of rotation so that the angle at which the restricting plate faces the articles is varied.

With this configuration, the restricting plate rotates toward a downstream side in the same manner as a hinged door about the position adjacent to the one side surface of the trough. The articles can therefore flow more smoothly than when the restricting plate is caused to rotate about a central position of the trough.

Preferably, the conveying device is further characterized in that an up/down position of the restricting plate is variable.

The configuration which makes the up/down position of the restricting plate variable may be, in addition to a configuration in which the restricting plate itself is moved up and down, a configuration in which the axis of rotation of the restricting plate is slightly inclined in an oblique manner from the vertical direction so that a radial-side end of the restricting plate gradually rises when the restricting plate rotates. This makes it possible to adjust a space between a bottom surface of the trough and the restricting plate in addition to adjusting the space between the side surface of the trough and the restricting plate.

Preferably, the conveying device is further characterized in that the restricting plate is rotatably suspended from a device frame via a rod-shaped member.

This makes it possible to easily adjust the space between the restricting plate and the side surface of the trough by rotating the restricting plate about the rod-shaped member.

Preferably, the conveying device is further characterized by being configured such that the rod-shaped member is rotatably inserted into a ring part at a head part of a bolt, and the bolt is inserted into a through-hole in the device frame and fastened using a nut, whereby the ring part is fitted into the through-hole, and the rod-shaped member within the ring part is pushed to the device frame.

This configuration enables to adjust the up/down position of the rod-shaped member and the angle of the restricting plate attached to the rod-shaped member at the same time merely by loosening or fastening the nut. Therefore, the user of the device can very easily adjust the conveying amount. For example, the user can adjust the space between the bottom surface of the trough and the restricting plate by adjusting the up/down position of the rod-shaped member. That is, it is possible for the user to perform an operation in which the conveying amount is roughly controlled by adjusting the up/down position of the rod-shaped member, and the conveying amount is more finely controlled by adjusting the angle of the restricting plate.

In one aspect, a combination weighing apparatus according to the present invention is a combination weighing apparatus in which a plurality of the conveying devices are arranged radially about a distribution part disposed in an upper part in a center of the apparatus, characterized in that a device frame is disposed so as to surround the distribution part above the plurality of conveying devices, and restricting plates of the conveying devices are attached to the device frame. Alternatively, the combination weighing apparatus according to the present invention is a combination weighing apparatus in which a plurality of the conveying devices are arranged in a row, characterized in that a device frame is disposed above the plurality of conveying devices, and restricting plates of the plurality of conveying devices are attached to the device frame.

This makes it possible to reduce the conveying amount to a small amount which is not controllable by regular conveyance control of the conveying device. Therefore, even a large-size combination weighing apparatus can be used to adjust and weigh a small conveying amount comparable to an amount handled by a small-size combination weighing apparatus.

Advantageous Effects of Invention

In the conveying device according to the present invention, the conveying amount in the trough can be adjusted by varying the angle at which the restricting plate faces the articles and thereby adjusting the gap between the side surface of the trough and the restricting plate. As a result, it can reduces a necessity to prepare a plurality of restricting plates that have different materials and shapes or to exchange such a plurality of restricting plates compared with conventional devices. It is therefore possible to provide to users a conveying device in which the cost is reduced and in which an operation to adjust the conveying amount can be easily performed.

In addition, in the conveying device according to the present invention, the angle and up/down position of the restricting plate can be varied through a one-touch operation. Therefore, user's operating efficiency in adjusting the conveying amount can be improved. As a result, the time required for adjustment can be reduced.

In the combination weighing apparatus according to the present invention, using the restricting plate enables to reduce the conveying amount to a small amount which is not easily controlled in conventional large-size conveying devices. Therefore, even a large-size combination weighing apparatus can be used in the combination weighing of small amounts comparable to amounts handled by small-size combination weighing apparatuses.

BRIEF DESCRIPTION OF THE DRAWINGS

FIG. 1 is a front view of a main section of one embodiment of a conveying device according to the present invention;

FIG. 3 is an external perspective view of a main section of one embodiment of a combination weighing apparatus according to the present invention.

DESCRIPTION OF EMBODIMENTS

Figure 2:
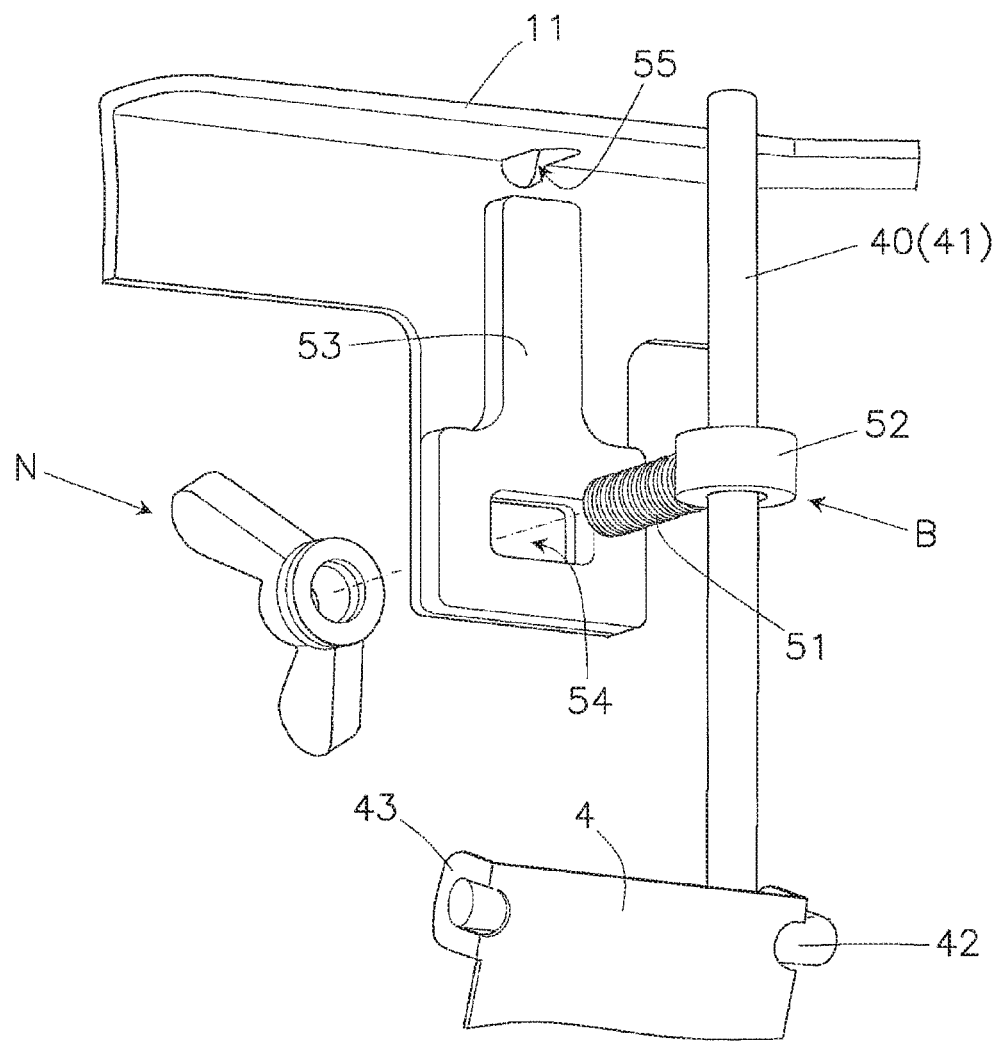
FIG. 2 is an exploded perspective view showing a process to attach a restricting plate in FIG. 1 to a device frame.

An embodiment of a conveying device according to the present invention and an embodiment of a combination weighing apparatus in which the conveying device is mounted are described below with reference to the drawings. The embodiments indicated below are not provided by way of any limitation of the technical scope of the present invention.

FIG. 1 is a front view of a main section of a conveying device 1 according to one embodiment. FIG. 2 is an exploded perspective view detailing a process to attach a restricting plate that constitutes a part of the conveying device. FIG. 3 is an external perspective view of a main section of a combination weighing apparatus 10 in which a plurality of conveying devices 1 are arranged radially. In these drawings, the conveying device 1 is provided with a trough 2 to convey articles (not shown), an electromagnetic vibration device 3 to cause the trough 2 to vibrate along a prescribed angle of elevation and to cause the articles in the trough 2 to advance in jumps, and a restricting plate 4 to restrict a flow of the articles conveyed by the trough 2.

The trough 2 is formed by bending a stainless steel sheet. The trough 2 is provided with: a bottom surface 20 of which a front side facing the viewer is wide and a side further away from the viewer is narrow when the trough 2 is shown from the downstream side of the conveyance direction of the articles; two side surfaces 21 that widen out in a V shape from two sides of the bottom surface 20; an overlapping part 22 that, when troughs 2 are arranged radially as shown in FIG. 3, overhangs an upper-edge part of an adjacent trough 2 on the viewer's right side when the trough 2 is shown from the downstream side of the conveyance direction of the articles; and a dish-shaped attachment member 23 detachably connected to the electromagnetic vibration device 3.

The overlapping part 22 is formed in a protruding shape that arches from the trough side surface 21 on the viewer's right side toward the right-side adjacent trough 2 when the trough 2 is shown from the downstream side of the conveyance direction of the articles. The overlapping part 22 overhanging a left-side surface 21 of the right-side adjacent trough 2 prevents the articles from spilling out from a gap between the adjacent troughs 2. In addition, the presence of the overlapping part 22 makes a single container which is formed from the entirety of the troughs 2 linked in the manner of a chain and receives articles dropped from above.

The electromagnetic vibration device 3 has a well-known configuration which vibrates with an electromagnet an oscillation plate oscillatably supported by a parallel leaf spring. Therefore, the attachment member 23 on the bottom surface of the trough 2 is detachably secured to the oscillation plate of the electromagnetic vibration device 3 (this relationship is not shown in the drawings).

The restricting plate 4 is formed from a stainless steel sheet. The restricting plate 4 is suspended from a device frame 11 via a rod-shaped member 40 and a fastener 50 in a state of being raised relative to the trough 2 as shown in FIG. 1.

The rod-shaped member 40 is provided with a vertical portion 41 and a horizontal portion 42. The vertical portion 41 is detachably attached to the device frame 11 via the fastener 50. The restricting plate 4 is secured to the horizontal portion 42 by welding. The vertical portion 41 of the rod-shaped member 40 is disposed offset to one of the side surfaces 21 of the trough 2. This configuration allows the restricting plate 4 to rotate about the position of the vertical portion 41 in the same manner as a hinged door.

FIG. 2 is an exploded perspective view of the fastener 50. In this drawing, the fastener 50 has a swing bolt B in which a ring part 52 is provided to a head part of a bolt 51, a wing nut N screwed onto the bolt 51, and a base part 53 secured to the device frame 11.

The vertical portion 41 of the rod-shaped member 40 is inserted into the ring part 52 of the swing bolt B, and a slight clearance is formed between an inner wall of the ring part 52 and an outer wall of the rod-shaped member 40. Due to this, the rod-shaped member 40 falls out from the ring part 52 in a state where the rod-shaped member 40 is merely inserted to the ring part 52. However, falling out of the rod-shaped member 40 from the ring part 52 is prevented by a through-hole 54 in the base part 53 into which the ring part 52 is fitted, and the wing nut N screwed onto the bolt 51.

Specifically, the through-hole 54 is formed in a lower section of the base part 53 and in the device frame 11 arranged on back side of the base part 53. The through-hole 54 has a size which enables to accommodate substantially half of the ring part 52. When the vertical portion 41 of the rod-shaped member 40 is inserted into the ring part 52 while inserting the bolt 51 of the swing bolt B into the through-hole 54, and the wing nut N is then screwed onto the bolt 51 protruding from the back side of the base part 53, the ring part 52 fits into the through-hole 54, and the rod-shaped member 40 is pushed to the base part 53. The rod-shaped member 40 is thereby detachably secured to the base part 53 of the device frame 11.

A distributed supply device of the combination weighing apparatus 10 is configured such that a plurality of conveying devices 1 are arranged radially about a distribution part DF disposed at a center of the apparatus, as shown in FIG. 3. The ring-shaped device frame 11 from which the restricting plates 4 suspends is disposed above the troughs 2 so as to surround the distribution part DF.

The device frame 11 is supported on a side surface of a cover 14, shaped as an upside-down container, via four arm parts 12 protruding outward from four opposing locations of the device frame 11 and four support columns 13 supporting the arm parts 12. The electromagnetic vibration devices 3 of the conveying devices 1 are accommodated in the cover 14. Waterproof boots are used to cover connection portions between the dish-shaped attachment members 23, shown in FIG. 1, and the electromagnetic vibration devices 3 to prevent water from going into the cover 14.

Distal end parts of the troughs 2 are positioned so as to face openings of pool hoppers (not shown). Below each of the pool hoppers, a corresponding weighing hopper (not shown) is disposed. Such a configuration is well known, and therefore a description thereof is not given here.

Next, the method of adjusting a conveying amount using the restricting plates 4 is described.

The conveying amount in each of the conveying devices 1 of the combination weighing apparatus 10 is determined by a combination target value and a final number of selected hoppers. For example, if the combination target value is 100 g and the number of selected hoppers is four, approximately 25 g of the articles will be supplied to each of the hoppers.

The restricting plates 4 are unnecessary when such a supply amount can be adjusted merely by controlling an amplitude and vibration time of the troughs 2. Therefore, the operator loosens the wing nuts N of the fasteners 50, sets the restricting plates 4 to be a state completely raised above the articles and then makes the combination weighing apparatus 10 perform the regular operation. However, the restricting plates 4 are used in cases where the supply amount cannot be sufficiently reduced by a regular operation, such as when, for example, a granular material that readily rolls is to be conveyed.

In such a case, the wing nuts N are loosened and the restricting plates 4 are lowered. Then, the operator secures the restricting plates 4 at positions at which spaces between lower-end edges of the restricting plates 4 and the bottom surfaces of the troughs 2 form a prescribed interval. This securing position can be determined, for example, by a test operation performed in advance. In addition, the operator sets the angle at which the restricting plates 4 face the articles to zero. In other words, the operator sets the restricting plates 4 to be oriented in a direction orthogonal to a conveyance direction of the articles.

In this state, the operator monitors the amount supplied from the troughs 2 using weighing values weighed at the weighing hoppers. When the monitoring result indicates that the supply amount is excessive, the operator further reduces the supply amount by lowering the restricting plates 4. On the contrary, when the supply amount is low, the operator gradually increases the angle at which the restricting plates 4 face the articles to adjust the conveying amount in the troughs 2. At that time, the operator loosens the wing nuts N of the fasteners 50 and changes the angle of the restricting plates 4 slightly, and then checks the supply amount. This adjustment operation is repeatedly performed to roughly adjust the conveying amount in the troughs 2. After that, an actual operation is started by controlling the amplitude and vibration time of the troughs 2.

A through-hole 55 provided in the device frame 11 above the base part 53 in FIG. 2 is an escape hole for the rod-shaped member 40 for when the restricting plate 4 is retained in a state of being completely raised above the articles.

An embodiment of the present invention is described above, but the present invention is in no way limited thereby, and other embodiments can also be employed. For example, in the embodiment described above, the vertical portion 41 of the rod-shaped member 40 is configured as a round rod, but a cross-sectional surface of the vertical portion 41 may be formed in, e.g., a polygonal shape, and an orientation of a restricting plate 4 may be switched in a stepwise manner. In such a case, an effect is achieved in which the angle of the restricting plates 4 is readily unified.

In addition, in the above embodiment, the restricting plate 4 is secured to the horizontal portion 42 of the rod-shaped member 40. However, the restricting plate 4 may also be configured so as to be capable of rotating with respect to the horizontal portion 42. For example, a configuration may be adopted in which a screw thread is formed on the horizontal portion 42 shown in FIGS. 1 and 2, nuts are mounted on the screw thread, and left and right brackets 43 that extend perpendicularly from the restricting plate 4 are secured by being sandwiched from the left and right by the respective nuts. This configuration further simplifies the operation to restrict the layer thickness of the articles because a lower end part of the restricting plate 4 can be moved up and down without an up and down movement of the rod-shaped member 40.

In addition, in the embodiment described above, a plurality of conveying devices are arranged radially about the distribution part disposed at the upper part of the center of the apparatus. However, instead, a combination weighing apparatus may have a plurality of conveying devices arranged in a row and weighing hoppers and pool hoppers arranged at a lower level of the conveying devices in a linear configuration. In this case, the device frame from which the restricting plates are suspended is disposed so as to straddle the troughs.

REFERENCE SIGNS LIST

1 Conveying device
2 Trough
3 Electromagnetic vibration device
4 Restricting plate
10 Combination weighing apparatus
11 Device frame
40 Rod-shaped member
41 Vertical portion
42 Horizontal portion
51 Bolt
52 Ring part
54 Through-hole
N Nut
DF Distribution part

CITATIONS LIST

Patent Literature

Patent Literature 1: Japanese Laid-open Patent Publication No. 11-326023
Patent Literature 2: Japanese Laid-open Patent Publication No. 2017-53747

The invention claimed is:
1. A conveying device to convey articles in a conveying direction in a trough, comprising:
a restricting plate arranged downstream of a location where the articles are supplied to the trough in the conveying direction and configured to restrict a flow of the articles in the trough,
wherein an angle at which the restricting plate faces the articles is variable.
2. The conveying device according to claim 1, wherein the restricting plate is configured to rotate about a position adjacent to one side surface of the trough serving as an axis of rotation so that the angle is varied.
3. The conveying device according to claim 1, wherein an up/down position of the restricting plate is variable.
4. The conveying device according to claim 1, wherein the restricting plate is rotatably suspended from a device frame via a rod-shaped member.
5. The conveying device according to claim 4, wherein the conveying device is configured such that the rod-shaped member is rotatably inserted into a ring part at a head part of a bolt, and the bolt is inserted into a through-hole in the device frame and fastened using a nut, whereby the ring part is fitted into the through-hole, and the rod-shaped member within the ring part is pushed to the device frame.
6. A combination weighing apparatus in which a plurality of the conveying devices according to claim 1 are arranged radially about a distribution part disposed in an upper part in a center of the apparatus, wherein
a device frame is disposed above the plurality of conveying devices so as to surround the distribution part, and the restricting plates of the conveying devices are attached to the device frame.
7. A combination weighing apparatus in which a plurality of the conveying devices according to claim 1 are arranged in a row, wherein
a device frame is disposed above the plurality of conveying devices, and the restricting plates of the plurality of conveying devices are attached to the device frame.

* * * * *